United States Patent Office 3,256,960
Patented June 21, 1966

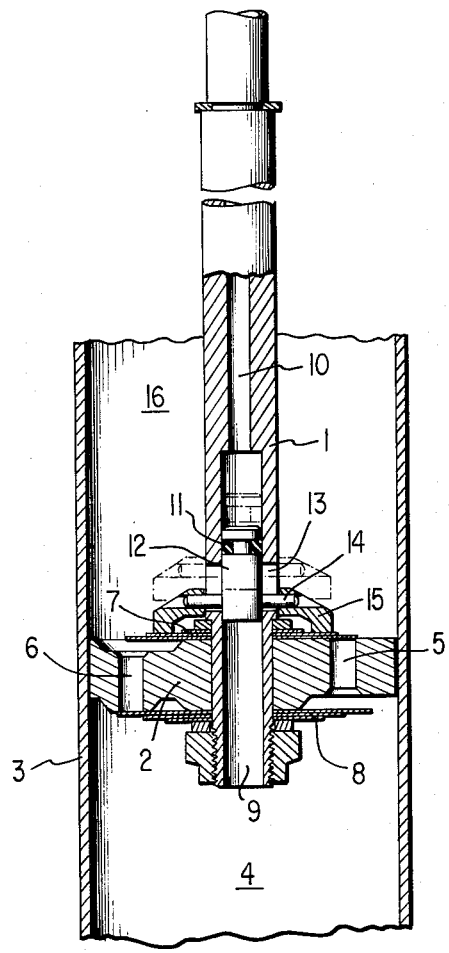

3,256,960
HYDRAULIC SHOCK ABSORBER WITH ADJUSTABLE VALVE BIASING MEANS
Manfred Casimir, Esslingen-Hegensberg, Germany, assignor to Daimler-Benz Aktiengesellschaft, Stuttgart-Unterturkheim, Germany
Filed Dec. 10, 1963, Ser. No. 329,569
Claims priority, application Germany, Dec. 13, 1962,
D 40,495
16 Claims. (Cl. 188—87)

The present invention relates to an adjustable hydraulic shock absorber, especially for motor vehicles, including a shock absorber piston secured to a piston rod, which piston is provided with flow openings or apertures having spring-loaded check or relief valves for the hydraulic medium. It is proposed according to the present invention that during the operation an auxiliary force is adapted to be externally introduced in dependence on the need which changes and in particular reinforces the return force acting on the opening relief valves.

As compared to shock absorbers in which during the operation additional flow apertures are controlled in the opening and/or closing direction for purposes of changing the shock absorber performance, the adjusting mechanism according to the present invention permits, on the one hand, a very delicate and sensitive adjustment of the absorber performance and, on the other, also a change within desired limits as the auxiliary force is supplied from the outside and can be varied at will, whereas with the forementioned opening and closing controls, one is dependent on the given cross sections present within the system.

The adjustment in accordance with the present invention may thereby be made, for example, in such a manner that the auxiliary force adjusts the abutment of the valve return spring and therewith changes the spring pre-stress. However, it is also possible within the scope of the present invention to cause a part of the valve return spring to be blocked by the auxiliary force and therewith to change the spring characteristics. This offers the advantage that the pre-stress may be selectively retained or eliminated.

Furthermore, an adjusting mechanism according to the present invention has the advantage that one can let the introduced or selectively supplied auxiliary force act only on the one type of relief valve whereas changes in opening cross sections are effective in both directions, that is, during compression and drawing or push and pull movements of the shock absorber. Thus, it is frequently important with motor vehicle shock absorbers, for purposes of achieving driving comfort in city driving as well as highway driving, to increase the shock absorber performance, especially during inward spring deflections of the wheels, that is, during compression movement of the shock absorber, with fast highway driving as compared to a soft damping performance advantageous for city driving. This increase of the shock absorber performance during inward spring deflections of the wheel is particularly noticeable in the vehicle.

It is proposed for the construction of the adjusting mechanism according to the present invention that the auxiliary force, introduced or supplied through the piston rod, loads or acts upon the valve return springs by way of an adjusting member movable relative to the piston rod-shock absorber piston combination whereby the adjusting member may consist of a slide member axially movable within the piston rod and of an annular member mechanically connected therewith through longitudinal apertures in the piston rod which annular member is intended to press against the valve return spring, preferably a springy set of valve plates.

A hydraulic medium which acts on the slide member against a return force is particularly suited as a medium for the initiation of the auxiliary force. This return force can be produced, for example, by a spring. However, with shock absorbers in which the space disposed in front of the shock absorber piston is constantly under pressure, for example, with shock absorbers having a gas-pressure pre-stress, a simple solution consist in deriving the return force by the pressure medium disposed in front of the shock absorber piston in that it loads the slide member from the opposite side as the hydraulic-adjusting force admitted and supplied through the piston rod.

With motor vehicles, the adjustment of the shock absorber is, as a rule, such that during inward spring deflections of the wheel, that is, during compression movements of the shock absorber, a considerably smaller damping effect or work occurs than with the outward spring deflections, that is, during drawing movements of the shock absorber. With more rapid highway driving, it has been found to be particularly advantageous not only to increase the damping effect of the shock absorber for the compression movements but also that for the drawing movements. This may be readily achieved with a shock absorber according to the present invention in such a manner that the adjusting member, acting in the one position on the relief valves opening during compression movements of the shock absorber, opens in the other position a by-pass path for the hydraulic shock absorber medium parallel to the path through the flow apertures provided with relief valves.

In particular, the arrangement may thereby be made in such a manner that the parallel path consists of an axial bore of the piston rod open in the direction toward the space in front of the shock absorber and also accommodating the sliding member and of the longitudinal apertures in the piston rod necessary for the connection of the slide member and the annular member. The axial bore thereby serves simultaneously for the supply of the return force to the slide member and as parallel flow path, and the longitudinal apertures serve simultaneously as apertures for the connecting member between the slide member and the annular member and also as parallel flow path.

For special applications, for example, for military vehicles, tanks, movable launcher pads and the like, the return force can be reinforced by the auxiliary force to such an extent that any flow or passage of hydraulic medium is interrupted and therewith wheel-stroke movements are completely blocked.

Accordingly, it is an object of the present invention to provide an adjustable hydraulic shock absorber, especially for motor vehicles, which avoids the drawbacks and shortcomings encountered with the prior art constructions by simple and operationally reliable means.

Another object of the present invention resides in the provision of a hydraulic shock absorber which is adapted to be selectively adjusted at the will of the driver by means of an externally supplied and controlled auxiliary force, thereby assuring very fine adjustability within any desired limits.

A further object of the present invention resides in the provision of a hydraulic shock absorber which is adjustable in such a manner that the pre-stress of the springs can be maintained under all operating conditions.

Still a further object of the present invention resides in the provision of an adjustable shock absorber in which the adjustment is effective only in connection with one type of movement of the shock absorber, that is, only with one set of relief valves provided within the shock absorber.

Still a further object of the present invention resides in the provision of a hydraulic shock absorber for motor vehicles which may be selectively adjusted in such a manner as to assure driving comfort both in city driving and high-speed highway driving.

Another object of the present invention resides in the provision of an adjustable hydraulic shock absorber which is simple in construction and obviates the need for a separate pressure medium to produce the return force.

Still another object of the present invention resides in the provision of a shock absorber that is adjustable in such a manner that the shock absorber damping effect may be increased for both compression and drawing movements of the shock absorber.

These and other objects, features and advantages of the present invention will become more obvious from the following description when taken in connection with the accompanying drawing which shows, in the single figure thereof, one embodiment in accordance with the present invention.

Referring now to the drawing which shows in the single figure thereof a partial cross-sectional view through an adjustable shock absorber of a passenger motor vehicle in accordance with the present invention, piston rod 1 together with the shock absorber piston 2 is operatively connected in any suitable manner with the vehicle frame or body. The cylinder 3 is connected through suitable conventional means with the wheel axle. The pressure medium space 4 disposed in front of the shock absorber piston 2 is closed off at the bottom by a separating piston (not shown) which is arranged between the hydraulic pressure medium and a pressurized gas volume. Throttling apertures or openings 5 for the compression movements of the shock absorber and throttling apertures or openings 6 for the drawing movements of the shock absorber are provided as usual within the shock absorber piston 2. The apertures 5 and 6 are closed by springy valve plate sets 7 and 8 operable as check or relief valves.

The piston rod 1 is provided at the lower end thereof with an axial bore 9 which is continued in the upward direction in a relatively narrower bore 10. A sliding member 12 provided with a seal 11 slides within the bore 9. Two longitudinal apertures 13 are provided within the walls of the piston rod 1 within which a pin 14 inserted through the slide member 12 can slide in the upward and downward direction. The annular member 15 is operatively connected with the slide member 12 with the aid of this pin 14. The annular member 15 rests in the position thereof shown in full line on the valve plate set 7. In the position of the adjusting member assembly 11, 12, 14, and 15 shown in dot and dash lines, a communication is established by way of the bore 9 and the longitudinal apertures 13 between the pressure medium space 4 disposed in front of the piston 2 and the pressure medium space 16 disposed to the rear of this piston 2.

With a "soft" shock absorber adjustment, the bore 10 is without pressure so that the slide member 12 is held in the upper position thereof, as shown in the drawing in dash and dot line, by the excess pressure prevailing within the shock absorber space 4. The damping effected by the check or relief valves 7 and 8 during compression and drawing movements of the shock absorber is lessened by the continuously open communication 4–9–13–16.

With a "hard" shock absorber adjustment the pressure medium, for example, oil present within the bore 10, is placed externally under pressure either selectively and controlled at the will of the driver or automatically, for example, in dependence on the driving speed by any conventional speed-responsive control means. As soon as this pressure in bore 10 is larger than the internal pressure within the shock absorber, the adjusting member assembly 11, 12, 14 and 15 returns to the lower position thereof shown in full lines. The following two results are achieved by the return to the lower position of the adjusting member: The pressure medium flow or passage through the longitudinal apertures 13 is blocked, and a force is exerted on the valve plate set 7 which presses the valve plates disposed below the annular member 15 securely against the shock absorber piston 2 so that only the outer portion of the valve plates can lift off though against a considerably larger resistance. The damping resistance during drawing movements is, therefore, increased by a certain amount corresponding to the elimination of the path through the longitudinal apertures 13. The damping resistance during compression movements, however, is not only increased by the aforementioned amount but additionally also by the stiffening of the spring characteristics effected by the annular member 15.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:
1. An adjustable hydraulic shock absorber, especially for motor vehicles, comprising:
   shock absorber cylinder means adapted to be operatively connected with one of the two parts consisting of the vehicle superstructure and the wheel axle,
   shock absorber piston means within said cylinder means,
   a piston rod secured to said piston means and adapted to be connected with the other of said two parts,
   said piston means being provided with aperture means for the hydraulic medium,
   spring-loaded check valve means for said aperture means operable to open only during movement of said piston means in one direction and normally acted upon by a return force opposing the opening thereof,
   and means for supplying an auxiliary force from the outside of said cylinder independent of any rotary movement of said piston and cylinder to change the return force acting on said check valve means including abutment means separate from but operable to engage with said check valve means for increasing the return force on said check valve means opposing the opening thereof in response to the auxiliary force.

2. The combination according to claim 1, wherein the auxiliary force so reinforces the return force opposing opening of the check valve means that any flow of the hydraulic medium through the piston means is prevented.

3. An adjustable hydraulic shock absorber, especially for motor vehicles, comprising:
   shock absorber cylinder means adapted to be operatively connected with one of the two parts consisting of the vehicle superstructure and the wheel axle,
   shock absorber piston means within said cylinder means,
   a piston rod secured to said piston means and adapted to be connected with the other of said two parts,
   said piston means being provided with aperture means for the hydraulic medium,
   spring-loaded valve means for said aperture means and normally acted upon by a return force opposing the opening thereof including valve spring means for producing said return force,
   and means for selectively admitting an auxiliary force in the form of an externally supplied pressure medium from the outside of said cylinder independent of any rotary movement of said piston and cylinder to change the return force acting on said valve means, said auxiliary force blocking a part of the spring means.

4. An adjustable hydraulic shock absorber, especially for motor vehicles, comprising:
shock absorber cylinder means adapted to be operatively connected with one of the two parts consisting of the vehicle superstructure and the wheel axle,
shock absorber piston means within said cylinder means,
a piston rod secured to said piston means and adapted to be connected with the other of said two parts,
said piston means being provided with aperture means for the hydraulic medium,
spring-loaded valve means for said aperture means and normally acted upon by a return force opposing the opening thereof,
and means for supplying an auxiliary force from the outside of said cylinder independent of any rotary movement of said piston and cylinder to change the return force acting on said valve means,
said piston means being provided with separate aperture means and separate valve means for the compression and drawing movements of the shock absorber,
said auxiliary force acting only on one type of said valve means and being thus effective in only one of the two directions corresponding to said compression and drawing movements.

5. An adjustable hydraulic shock absorber, especially for motor vehicles, comprising:
shock absorber cylinder means adapted to be operatively connected with one of the two parts consisting of the vehicle superstructure and the wheel axle,
shock absorber piston means within said cylinder means,
a piston rod secured to said piston means and adapted to be connected with the other of said two parts,
said piston means being provided with aperture means for the hydraulic medium,
spring-loaded valve means for said aperture means and normally acted upon by a return force opposing the opening thereof including valve spring means for producing said return force,
and means for selectively admitting an auxiliary force in the form of an externally supplied pressure medium from the outside of said cylinder independent of any rotary movement of said piston and cylinder through the piston rod to change the return force acting on said valve means,
and adjusting means movable relative to the piston-piston rod assembly and operable to load the spring means, said adjusting means being adjusted by the auxiliary force supplied through said piston rod.

6. An adjustable hydraulic shock absorber, especially for motor vehicles, comprising:
shock absorber cylinder means adapted to be operatively connected with one of the two parts consisting of the vehicle superstructure and the wheel axle,
shock absorber piston means within said cylinder means,
a piston rod secured to said piston means and adapted to be connected with the other of said two parts,
said piston means being provided with aperture means for the hydraulic medium,
spring-loaded valve means for said aperture means and normally acted upon by a return force opposing the opening thereof including valve spring means for producing said return force,
and means for supplying an auxiliary force from the outside through the piston rod to change the return force acting on said valve means,
and adjusting means movable relative to the piston-piston rod assembly and operable to load the spring means, said adjusting means being adjusted by the auxiliary force supplied through said piston rod,
said adjusting means including a slide member axially movable within said piston rod, an annular member disposed about said piston rod, and means extending through longitudinal openings in said piston rod for mechanically connecting said annular member with said slide member, and said annular member being operable to press against said spring means.

7. An adjustable hydraulic shock absorber, especially for motor vehicles, comprising:
shock absorber cylinder means adapted to be operatively connected with one of the two parts consisting of the vehicle superstructure and the wheel axle,
shock absorber piston means within said cylinder means,
a piston rod secured to said piston means and adapted to be connected with the other of said two parts,
said piston means being provided with apertures means for the hydraulic medium,
spring-loaded valve means for said aperture means and normally acted upon by a return force opposing the opening thereof including valve spring means for producing said return force,
and means for supplying an auxiliary force from the outside through the piston rod to change the return force acting on said valve means,
and adjusting means movable relative to the piston-piston rod assembly and operable to load the spring means, said adjusting means being adjusted by the auxiliary force supplied through said piston rod,
said adjusting means including a slide member axially movable within said piston rod, an annular member disposed about said piston rod, and means extending through longitudinal openings in said piston rod for mechanically connecting said annular member with said slide member, and said annular member being operable to press against said spring means,
said slide member being adjustable by a hydraulic-adjusting force against a return force,
the space disposed in front of the piston means being constantly under pressure, and said return force being effectively produced by the pressure medium disposed within the space in front of the piston means, said return force acting on said slide member in the opposite direction to that of the hydraulic-adjusting force, 8. An adjustable hydraulic shock absorber, especially for motor vehicles, comprising:
shock absorber cylinder means adapted to be operatively connected with one of the two parts consisting of the vehicle superstructure and the wheel axle,
shock absorber piston means within said cylinder means,
a piston rod secured to said piston means and adapted to be connected with the other of said two parts,
said piston means being provided with aperture means for the hydraulic medium,
spring-loaded valve means for said aperture means and normally acted upon by a return force opposing the opening thereof including valve spring means for producing said return force,
and means for supplying an auxiliary force from the outside to change the return force acting on said valve means,
adjusting means movable relative to the piston-piston rod assembly and operable to load the spring means, said adjusting means being adapted to be displaced by the auxiliary force,
the adjusting means which acts in one position thereof on the valve means, effectively opening in the other position thereof a parallel flow path for the hydraulic shock absorber medium which is parallel to the path through the aperture means.

9. An adjustable hydraulic shock absorber, especially for motor vehicles, comprising:
shock absorber cylinder means adapted to be operatively connected with one of the two parts consisting of the vehicle superstructure and the wheel axle, shock absorber piston means within said cylinder means, a piston rod means secured to said piston means and adapted to be connected with the other of said two parts, said piston means being provided with aperture means for the hydraulic medium, spring-loaded valve means for said aperture means and normally acted upon by a return force opposing the opening thereof including valve spring means for producing said return force, and means for supplying an auxiliary force from the outside to change the return force acting on said valve means, adjusting means movable relative to the piston-piston rod assembly and operable to load the spring means, said adjusting means being adapted to be displaced by the auxiliary force, said adjusting means including a slide member axially movable within said piston rod means, and annular member disposed about said piston rod means and means extending through longitudinal openings in said piston rod means for mechanically connecting said annular member with said slide member, said annular member being operable to press against the spring means, the adjusting means which acts in one position thereof on the valve means, effectively opening in the other position thereof a parallel flow path for the hydraulic shock absorber medium which is parallel to the path through the aperture means, said parallel path consisting of an axial bore in said piston rod means open toward the space in front of the shock absorber piston means and accommodating therein said slide member and of said longitudinal openings within the piston rod means for the mechanical connection between the slide member and the annular member.

10. An adjustable hydraulic shock absorber, especially for motor vehicle, which includes a shock absorber piston connected to a piston rod and provided with apertures for the passage of a hydraulic medium and having spring-loaded relief valves including respective valve springs for said apertures, the improvement essentially consisting of means for supplying an auxiliary force from the outside to change the return force acting on said relief valves, said means including a slide member axially movable within said piston rod, an annular member disposed about said piston rod, and means extending through longitudinal bores within said piston rod for mechanically connecting said annular member with said slide member, said annular member being operable to press against the valve spring.

11. In an adjustable hydraulic shock absorber, especially for motor vehicles, which includes a shock absorber piston connected to a piston rod and provided with apertures for the passage of a hydraulic medium and having spring-loaded relief valves including respective valve springs for said apertures, the improvement essentially consisting of means for supplying an auxiliary force from the outside to change the return force acting on said relief valves, said means including a slide member axially movable within said piston rod, an annular member disposed about said piston rod, and means extending through longitudinal bores within said piston rod for mechanically connecting said annular member with said slide member, said annular member being operable to press against the valve spring, and the space disposed in front of the piston being constantly under pressure, and said return force being produced by the pressure medium disposed within the space in front of the piston and acting on said slide member on the side opposite to that side which is acted upon by the hydraulic adjusting-force.

12. An adjustable hydraulic shock absorber, especially for motor vehicles, comprising:

shock absorber cylinder means adapted to be operatively connected with one of the two parts consisting of the vehicle superstructure and the wheel axle, shock absorber piston means within said cylinder means, a piston rod secured to said piston means and adapted to be connected with the other of said two parts, said piston means being provided with aperture means for the hydraulic medium, spring-loaded valve means for said aperture means and normally acted upon by a return force opposing the opening thereof including valve spring means for producing said return force, and means for supplying an auxiliary force from the outside to change the return force acting on said valve means, said valve means having abutment means, and said auxiliary force adjusting said abutment means, said piston means being provided with separate aperture means and separate valve means for the compression and drawing movements of the piston means, said auxiliary force acting only on one type of said check valve means which open during compression movements of the shock absorber, adjusting means movable relative to the piston-piston rod assembly and operable to load the spring means, said adjusting means being adapted to be displaced by the auxiliary force supplied through said piston rod means, said adjusting means including a slide member axially movable within said piston rod, an annular member disposed about said piston rod, and means extending through longitudinal openings in said piston rod means for mechaically connecting said annular member with said slide member, said annular member being operable to press against the spring means, said slide member being adjustable by a hydraulic-adjusting force against a return force, the space disposed in front of the piston means being constantly under pressure, and said return force being produced by the pressure medium disposed within the space in front of the piston means, said return force acting on said slide member on the side opposite to that side which is acted upon by the hydraulic-adjusting force, the adjusting means which acts in one position thereof on the valve means opening during the compression movements of the shock absorber, effectively opening in the other position thereof a parallel flow path for the hydraulic shock absorber medium which is parallel to the path through the aperture means, said parallel path consisting of an axial bore in said piston rod means open toward the space in front of the shock absorber piston means and accommodating therein said slide member and of said longitudinal openings within the piston rod means for the mechanical connection between the slide member and the annular member.

13. An adjustable hydraulic shock absorber, especially for motor vehicles, comprising:

shock absorber cylinder means adapted to be operatively connected with one of the two parts consisting of the vehicle superstructure and the wheel axle, shock absorber piston means within said cylinder means, a piston rod secured to said piston means and adapted to be connected with the other of said two parts, said piston means being provided with aperture means for the hydraulic medium, spring-loaded relief valve means for said aperture means and normally acted upon by a return force opposing the opening thereof including valve and return spring means for producing said return force, and exterally controlled means for selectively admitting an auxiliary force in the form of an externally supplied pressure medium from the outside of said cylinder independent of any rotary movement of said piston and cylinder to change the return force acting on said valve means, said valve means having abutment means, and said auxiliary force adjusting said abutment means, said auxiliary force blocking a part of the spring means, said piston means being provided with separate aperture means and separate valve means for the compression and drawing movements of the shock absorber, said auxiliary force acting only on one type of said valve means which open during compression movements of the shock absorber.

14. An adjustable hydraulic shock absorber, especially for motor vehicles, comprising:

shock absorber cylinder means adapted to be operatively connected with one of the two parts consisting of the vehicle superstructure and the wheel axle, shock absorber piston means within said cylinder means, a piston rod secured to said piston means and adapted to be connected with the other of said two parts, said piston means being provided with aperture means for the hydraulic medium, spring-loaded valve means for said aperture means and normally acted upon by a return force opposing the opening thereof including valve spring means for producing said return force, and means for supplying an auxiliary force from the outside through the piston rod to change the return force acting on said valve means, and adjusting means movable relative to the piston-piston rod assembly and operable to load the spring means, said adjusting means being adjusted by the auxiliary force supplied through said piston rod, said adjusting means including a slide member axially movable within said piston rod, an annular member disposed about said piston rod, and means extending through longitudinal openings in said piston rod for mechanically connecting said annular member with said slide member, and said annular member being operable to press against said spring means, said slide member being adjustable by a hydraulic-adjusting force against a return force, the space disposed in front of the piston means being constantly under pressure, and said return force being effectively produced by the pressure medium disposed within the space in front of the piston means, said return force acting on said slide member in the opposite direction to that of the hydraulic adjusting force, the adjusting means which act in one position on the valve means opening during the compression movements of the shock absorber, effectively opening in the other position thereof a parallel path for the hydraulic shock absorber medium which is parallel to the path through the aperture means provided with valve means.

15. An adjustable hydraulic shock absorber, especially for motor vehicles, comprising:

shock absorber cylinder means adapted to be operatively connected with one of the two parts consisting of the vehicle superstructure and the wheel axle, shock absorber piston means within said cylinder means, a piston rod secured to said piston means and adapted to be connected with the other of said two parts, said piston means being provided with aperture means for the hydraulic medium, spring-loaded valve means for said aperture means and normally acted upon by a return force opposing the opening thereof including valve spring means for producing said return force, and means for supplying an auxiliary force from the outside through the piston rod to change the return force acting on said valve means, and adjusting means movable relative to the piston-piston rod assembly and operable to load the spring means, said adjusting means being adjusted by the auxiliary force supplied through said piston rod, said adjusting means including a slide member axially movable within said piston rod, an annular member disposed about said piston rod, and means extending through longitudinal openings in said piston rod for mechanically connecting said annular member with said slide member, and said annular member being operable to press against said spring means, said slide member being adjustable by a hydraulic-adjusting force against a return force, the space disposed in front of the piston means being constantly under pressure, and said return force being effectively produced by the pressure medium disposed within the space in front of the piston means, said return force acting on said slide member in the opposite direction to that of the hydraulic-adjusting force, the adjusting means which act in one position on the valve means opening during the compression movements of the shock absorber, effectively opening in the other position thereof a parallel path for the hydraulic shock absorber medium which is parallel to the path through the aperture means provided with valve means, said parallel path consisting of an axial bore in said piston rod means open toward the space in front of the shock absorber piston means and accommodating therein said slide member and of said longitudinal openings within the piston rod means for the mechanical connection between the slide member and the annular member.

16. An adjustable hydraulic shock absorber, especially for motor vehicles, comprising:

shock absorber cylinder means adapted to be operatively connected with one of the two parts consisting of the vehicle superstructure and the wheel axle, shock absorber piston means within said cylinder means, a piston rod secured to said piston means and adapted to be connected with the other of said two parts, said piston means being provided with aperture means for the hydraulic medium, spring-loaded valve means for said aperture means and normally acted upon by a return force opposing the opening thereof including valve spring means for producing said return force, and means for supplying an auxiliary force from the outside through the piston rod to change the return force acting on said valve means, said valve means having abutment means, and said auxiliary force adjusting said abutment means, said piston means being provided with separate aperture means and separate valve means for the compression and drawing movements of the piston means, said auxiliary force acting only on the one type of said valve means which open during compression movements of the shock absorber, and adjusting means movable relative to the piston-piston rod assembly and operable to load the spring means, said adjusting means being adjusted by the auxiliary force supplied through said piston rod, said adjusting means including a slide member axially movable within said piston rod, an annular member disposed about said piston rod, and means extending through longitudinal openings in said piston rod for mechanically connecting said annular member with said slide member, and said annular member being operable to press against said spring means, said slide member being adjustable by a hydraulic-adjusting force against a return force, the space disposed in front of the piston means being constantly under pressure, and said return force being effectively produced by the pressure medium disposed within the space in front of the piston means, said return force acting on said slide member in the opposite direction to that of the hydraulic-adjusting force, the adjusting means which act in one position on the valve means opening during the compression movements of the shock absorber, effectively opening in the other position thereof a parallel path for the hydraulic shock absorber medium which is parallel to the path through the aperture means provided with valve means, said parallel path consisting of the axial bore in the piston rod means open toward the space in front of the shock absorber piston means and accommodating therein the slide member and of said longitudinal openings within the piston rod means for the mechanical connection between the slide member and the annular member.

References Cited by the Examiner

UNITED STATES PATENTS

| | | | |
|---|---|---|---|
| 2,698,068 | 12/1954 | Hein | 188—87 |
| 2,869,685 | 1/1959 | Funkhouser et al. | 188—87 |
| 3,146,862 | 9/1964 | Winsen | 188—87 |

FOREIGN PATENTS

| | | |
|---|---|---|
| 120,442 | 10/1945 | Australia. |
| 69,631 | 3/1952 | Holland. |
| 1,134,565 | 4/1957 | France. |
| 478,753 | 7/1929 | Germany. |

MILTON BUCHLER, *Primary Examiner.*

ARTHUR L. LA POINT, *Examiner.*

H. FIELD, G. HALVOSA, *Assistant Examiners.*